Sept. 7, 1954 M. EPSTEIN ET AL 2,688,381
SODA WATER MAKING PROCESS AND APPARATUS
Filed April 23, 1949

INVENTORS
Meyer Epstein
James S. Pratt

Patented Sept. 7, 1954

2,688,381

UNITED STATES PATENT OFFICE 2,688,381

SODA WATER MAKING PROCESS AND APPARATUS

Meyer Epstein, Brooklyn, N. Y., and
James S. Pratt, Media, Pa.

Application April 23, 1949, Serial No. 89,334

4 Claims. (Cl. 183—115)

The invention relates to soda water machines and aims to produce an almost continuous supply of carbonated water.

It is the growing practice today to drink carbonated water in a variety of forms, at home, at work, and at play. The different forms of this beverage range from plain soda water or "Seltzer" through flavored drinks such as orangeade and lemonade, to the special drinks, each claiming some distinctive taste or other property. All these drinks are basically water, dissolved carbon dioxide, and flavoring. They are generally dispensed in bottles or from vending machines and soda counters, but in all cases, the supply is exhaustible, usually at a most inconvenient time, and there is the great nuisance and economic waste of storing and returning glass bottles and recharging carbon dioxide cylinders.

The object of the present invention in to produce a machine which will automatically yield an almost endless supply of plain soda water, limited only by the supply of gas and drinking water from the mains, and by a reasonable rate of recuperation.

This object is accomplished by taking the gaseous products of combustion of domestic gas, cleaning and cooling them, and then compressing them so that they may be delivered into a reservoir where drinking water is stored under pressure. The carbon dioxide present in the gaseous products of combustion then goes into solution in the water and the other gases collect above the water and are periodically released to the atmosphere through a vent valve. The carbonated water is withdrawn through a faucet as required.

A more complete understanding of our machine may be had from the following detailed description, and reference should be made to the accompanying drawings in which.

Figure 1:
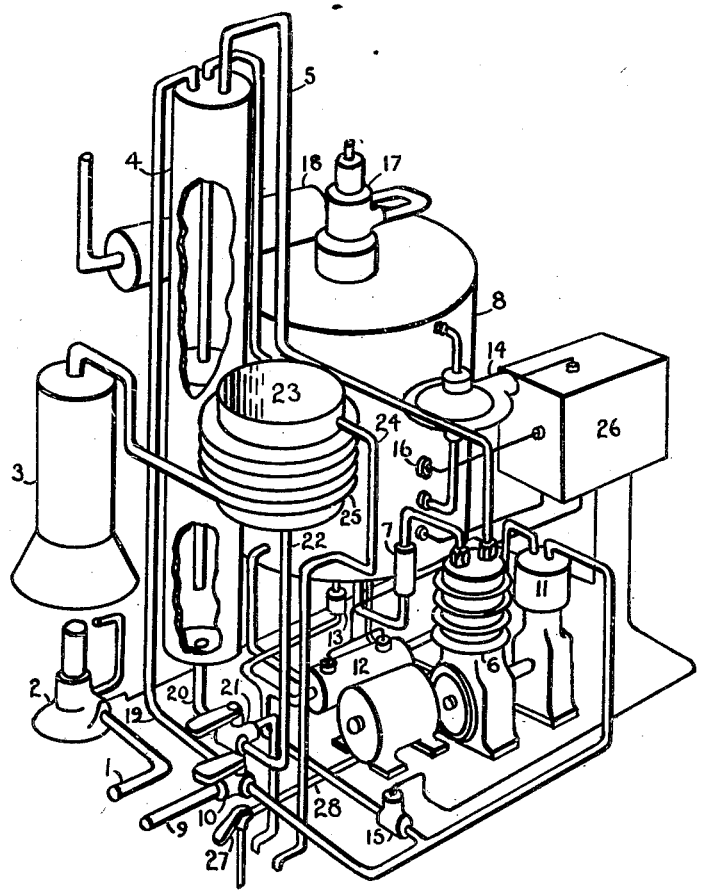
Figure 1 is a perspective view of a simple machine.
Figure 2:
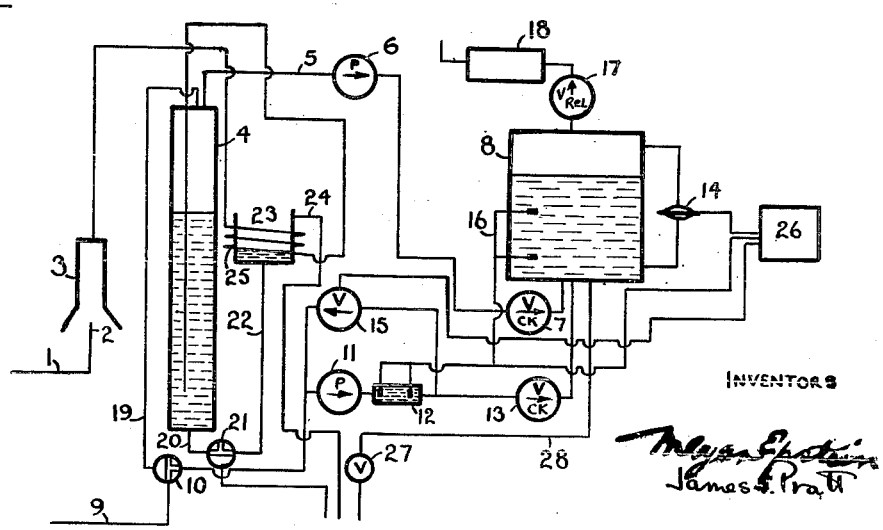
Figure 2 is a single line drawing of the flow of the fluids through the machine.

Gas from the main supply pipe 1 is led to a standard burner and pilot control 2, where it is burnt. The products of combustion, carbon dioxide, carbon monoxide, water, oxygen, nitrogen, impurities and inert gases, are caught in a funnel 3 and pulled by an air pump 6, through the heat transfer coils 25, down through the water in a tall washing tower 4, where it is cleansed of carbon particles and objectionable odors. The draining and replacing of this cleansing water is described later. The cleaned gases are passed via pipe 5 through the air pump 6, and check valve 7, into the large reservoir 8 in which water is maintained within certain levels and at a certain pressure. Control of this water level and pressure is discussed later.

In the reservoir, the carbon dioxide goes into solution, being much more soluble than the other gases present, and is aided in its solution by the usual device of perforated baffle plates which are not shown in the drawings. A certain amount of excess carbon dioxide also collects at the top of the reservoir along with the other undissolved gases. The release of these gases to the atmosphere will be described later.

Drinking water is led by pipe 9 through the three-way cock 10 to a pump 11, driven by the same shaft as the air pump 6, and thence through a "pH" indicator 12, and check valve 13 into the reservoir 8. The pump is fitted with the standard pressure relief valve overflowing into the pump suction, not shown, and also an extra relief valve 15, operated electrically by the control system, allowing the pump to discharge into its suction line.

The control of the machine is by electrical and mechanical means but it is not intended to restrict the application to the methods described below. Other methods of controlling the level of the water in the reservoir 8 and of releasing the unsoluble gases from the top of the reservoir are available and those methods which are most economical would be chosen.

The concentration of the carbon dioxide in solution in the water in the reservoir 8 is determined by the "pH" indicator 16, which measures the acidity of the carbonic acid formed by the solution of carbon dioxide in water under pressure. When the acidity falls below the required amount, the gas is turned on and ignited, using a standard pilot ignition control, and then the air pump 6 is started to pump the gaseous products of combustion to the reservoir 8, as described earlier. Fluctuations in the acidity or alkalinity of the supply water is countered by the "pH" indicator 12, acting in series with, but in reverse to "pH" indicator 16, which measures the acidity or alkalinity of the water being delivered from the pump 11. If the machine is started up to supply carbon dioxide to the reservoir and water is not required, the water will be returned to the suction side of pump 11, as described in the previous paragraph; if it is required, it will be pumped into the reservoir 8.

The level of the water in the reservoir 8 is controlled by the differential pressure diaphragm valve 14 acting through electrical switches and relays mounted in control box 26 on the solenoid operated relief valve 15, which by-passes water from the pump 11 if the pump is running and water is not required, or alternatively starts the pump to supply the required water. When the machine is started to supply water and carbon dioxide is not required, the gas is not turned on and air only is pumped into the reservoir 8, where it collects above the water to be released to the atmosphere periodically.

Although the operations of supplying carbon dioxide only, and of supplying water only, have been described separately, in general it will be possible to adjust the discharges of the air pump 6 and the pump 11 so that carbon dioxide and water will be required together.

The pressure in the reservoir 8 never falls below a certain pressure, but, as more and more unsoluble gases accumulate at the top of the reservoir, the pressure increases until the pressure relief valve 17 lifts to release the gases through the silencing muffler 18 to the atmosphere.

The water in the tall washing tower 4 is supplied, before the machine is first put into operation, by directing the three-way cock 10 to send water by pipe 19 to the top of the washing tower 4. This water collects in the washing tower 4 and also flows by pipe 20, three-way cock 21, pipe 22 to the evaporating pan 23, and overflows by pipe 24. The supply of water is stopped as soon as an overflow from pipe 24 is obtained and the three-way cock is reversed to make water available for the pump 11. As air is trapped in the top of the washing tower 4 against the inlet valves of air pump 6, in this initial filling operation, the level of the water in the washing tower is below that at the overflow pipe inlet 24 and, when the machine is started and this trapped air is drawn off by the air pump 6, the level of water in the washing tower 4 rises, and the level in the evaporation pan 23 falls. With the machine running, much of the water formed by combustion and that already in the air used in combustion collects in the washing tower 4. The quantity of water in the washing tower 4 and the evaporation pan 23 would increase but for the evaporation from the top of the evaporation pan 23, aided by the heating action of the coils 25 through which pass the hot products of combustion. Excess evaporation is avoided by the level of the water in the evaporation pan 23 falling first below the heating coils 25, and then into the narrow pipe 22 from which evaporation is very small, until some level of equilibrium is reached. The height of the evaporation pan is so determined that this equilibrium level is high enough to maintain sufficient water in the washing tower to wash the gases.

With the machine now charged and in running order, there will be a supply of carbonated water immediately available for consumption. The carbonated water is obtained by opening faucet 27 allowing the water to flow via pipe 28, faucet 27 to the receptacle held under the faucet.

With the machine in constant use, the water in the washing tower is periodically changed. The cylinder of the washing tower is made of glass or other transparent material to allow easy inspection of the washing water to see when it is necessary to change the water. This is done manually as described below, but it is realized that in districts where the gas supply is not too free from impurities it may be necessary to arrange to have this renewal of water carried out automatically at frequent intervals. The three-way cock 21 is reversed to drain the water from the evaporation pan 23 and the washing tower 4 and is left in this position. The three-way cock 10 is now reversed to send water from the main by pipe 19 into the washing tower 4 where it cleans out the washing tower and runs to a waste receptacle via three-way cock 21. When washing is completed, the three-way cock 21 is reversed to join the washing tower 4 to the evaporating pan 23 via pipe 20, three-way cock 21 and pipe 22 and as soon as an overflow is obtained from pipe 24, the three-way cock 10 is reversed to shut off the water from the washing tower and send it to the water pump 11. The machine is now ready for operation again.

It is intended to use the machine in conjunction with a refrigeration unit so that the reservoir 8 is kept cold to deliver cold carbonated water ready for immediate use. The evaporation coils 25 and the washing tower 4 serve as a means of cooling the hot gases of combustion so that hot gases are not supplied to the air pump 6. Where necessary, the hot gases of combustion may be further cooled by use of a fan or in extreme cases by a cooling coil from the refrigeration unit.

In many circumstances, the gases of combustion will be taken from some other apparatus which uses gas, such as a stove, hot water heater, gas heater or refrigerator in which the gaseous products of combustion are normally allowed to go to waste.

We claim:

1. A process for producing carbonated drinking water which comprises maintaining a body of potable water at a predetermined pressure above atmosphere, flowing gaseous products of combustion including carbon dioxide into the body of water, accumulating undissolved gases in the presence of the body of water, discharging accumuated gases from the presence of said body of water in such quantities that said pressure is not materially altered, and starting and stopping the flowing of gaseous products of combustion into the body of water responsive to change in acidity of the water.

2. A process for producing carbonated water which comprises maintaining a quantity of water, flowing products of combustion including water vapor and carbon dioxide in intimate contact with the water, preventing increase in said quantity of water by evaporation of water in excess of said quantity, dissolving the carbon dioxide in a second body of water at a higher pressure, and promoting said evaporation by heat transfer from the products of combustion to only said excess of water.

3. A soda water maker comprising a vessel adapted to withstand a predetermined internal pressure above atmosphere, a device for maintaining a substantially constant quantity of potable water in said vessel at said pressure, a device for delivering products of combustion including carbon dioxide into water in the vessel, a control for stopping and starting last said device operative responsive to change in acidity of the water, a device for discharging undissolved gases from said vessel in such quantities that said pressure is not materially altered, and a device for dispensing water from the vessel.

4. A soda water maker comprising a vessel adapted to hold water under pressure, a device for maintaining water under pressure in said vessel, a device for delivering products of combustion including carbon dioxide into water in said vessel, including a burner, a scrubber, a compressor, and an evaporator connected to receive water from said scrubber in excess of a predetermined quantity contained in the scrubber, and means for conducting the products of combustion from said burner to the scrubber in heat transfer relation to said evaporator.

References Cited in the file of this patent

UNITED STATES PATENTS

| Number | Name | Date |
| --- | --- | --- |
| 55,038 | Baldwin | May 29, 1866 |
| 2,048,656 | Hunt et al. | July 21, 1936 |
| 2,235,357 | Conklin | Mar. 18, 1941 |